Figure 3:
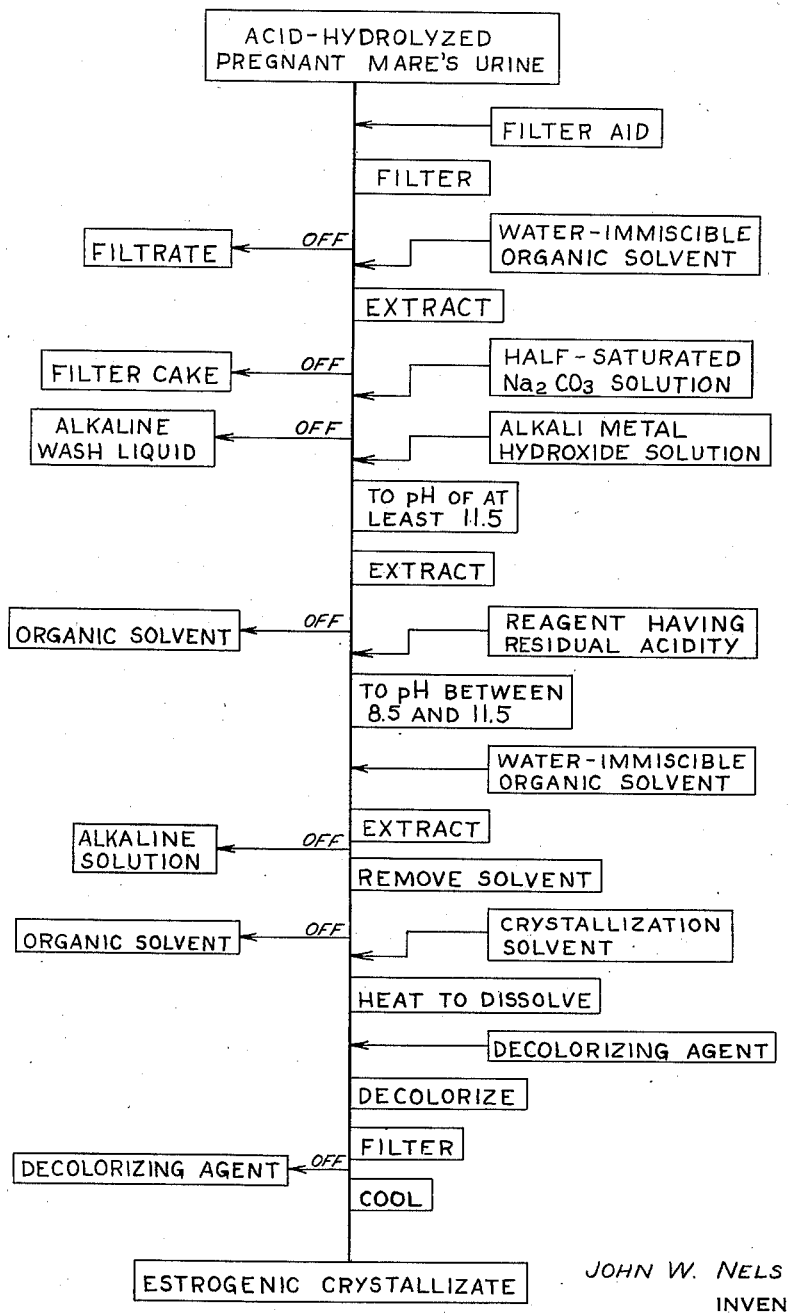

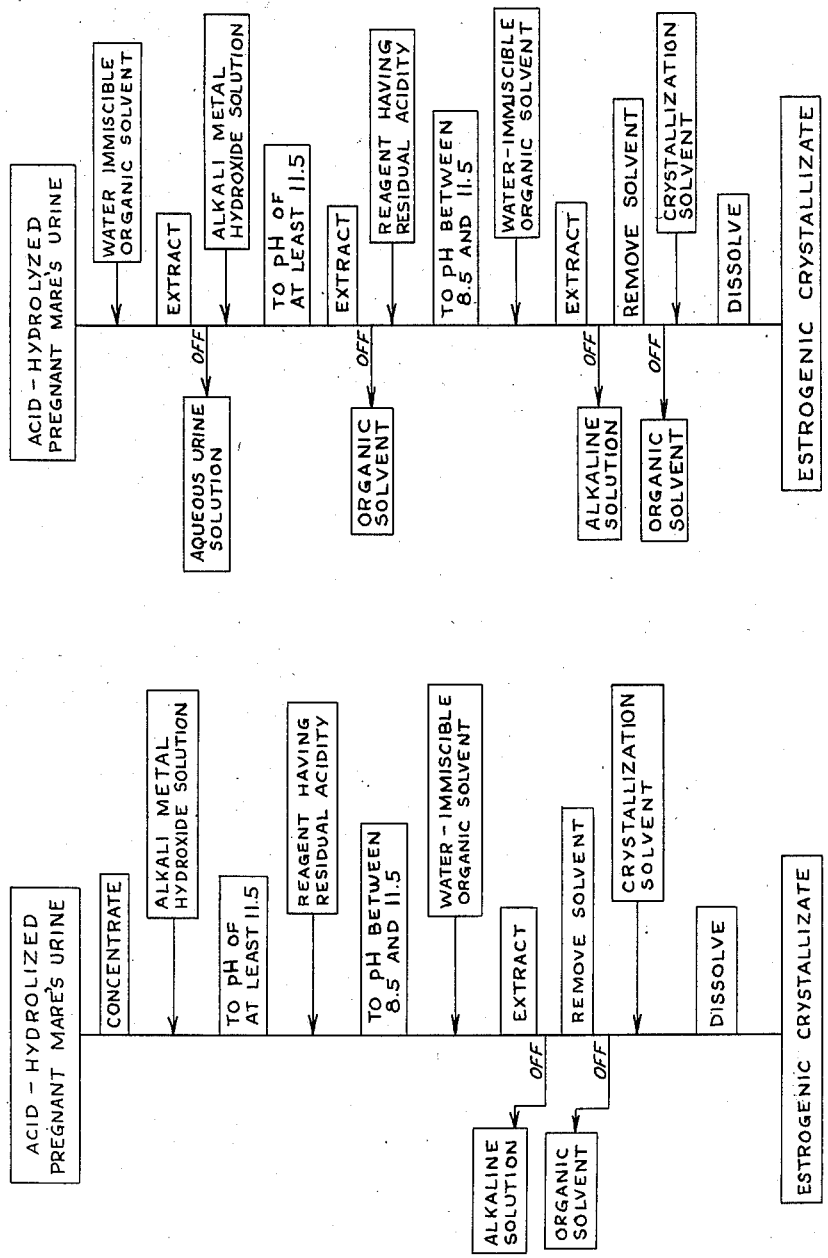

Patented Dec. 18, 1951

2,578,729

UNITED STATES PATENT OFFICE 2,578,729

EXTRACTION OF HYDROLYZED ESTROGENS FROM URINE

John W. Nelson, Kalamazoo, Mich., assignor to The Upjohn Company, Kalamazoo, Mich., a corporation of Michigan Application September 21, 1948, Serial No. 50,443

2 Claims. (Cl. 167—74.5)

This invention relates to a method for the purification of estrogenic material to increase the ratio of estrogenically active substances to total solids, and especially to the preparation of an estrogenic mixture which is convertible to an estrogenic crystallizate by direct crystallization from organic solvents. The invention further pertains to a method whereby an estrogenic crystallizate may be obtained directly from hydrolyzed urine containing estrogenically active substances by a simple procedure involving a minimum of operations and expense.

The isolation of estrogenic substances from urine has been the subject of study for many years (Fieser, Chemistry of Natural Products Related to Phenanthrene, 2nd ed., Reinhold Publishing Corporation, New York, pp. 193–200). A complete process for the isolation of purified estrogens from urine may be considered broadly as consisting of two parts: (1) separation of a crude water-insoluble, non-crystallizable estrogenic material from the urine, and (2) separation of crystalline estrogenic material from the active components of the crude estrogenic material.

The first step employed in the separation of the crude estrogenic material from urine containing the same, e. g., pregnancy urine, is usually that of acid, basic, or neutral hydrolysis, the acid hydrolysis being much preferred.

The crude estrogenic material, thus set free from its conjugates, may then be isolated by solvent extraction, evaporation of water, settling and decantation, adsorption on benzoic acid, or filtration. This crude material, however, has such a low proportion of estrogenically active substances to total solids that crystallization is impossible, even from organic solvents. This crude estrogenic material has consequently become known in the art as an "estrogenic tar," and innumerable complex purification procedures have been originated and employed to obtain from the crude material an estrogenic crystallizate having a satisfactory ratio of estrogenically active substances to solids. The active material in such a crystallizate or even in the crude material is sometimes referred to in terms of "estrone equivalents."

The separation of crystalline estrogenic material from the crude material has been accomplished by various complex procedures involving, among others, distribution between solvent pairs, acylation and separation of the acyl derivatives, precipitation of estrogens as a mercury or quinoline complex, the use of ketonic agents such as trimethylaminoacetohydrazide hydrochloride (Girard's reagent, also called betainehydrazide hydrochloride), carboxymethoxy amine, hydroxylamine, semicarbazide, and the like. The use of ketonic agents has especially found much favor in recent years. The tedious and complicated prior art processes for obtaining estrogenic crystallizates from hydrolyzed urine or from crude estrogenic materials are exemplified by the procedures disclosed in United States Patents 1,967,350, 1,967,351, 2,012,300, 2,046,656, 2,054,271, 2,103,735, 2,106,763, 2,174,532, and 2,178,109.

The ultimate object of these procedures is to reduce the estrogen-to-solid ratio to about one part estrogens to five parts or less total solids. When the concentration of estrogens is from one-third to one-fifth by weight of the total solids, the relatively pure estrogenic material readily crystallizes from organic solvents such as ethyl acetate, methyl alcohol, benzene, chloroform, and others. When the ratio of estrogenically active substances to total solids is less than about ten to one, and usually even less than seven to one, crystallization is difficult, losses of active material are high, and the ratio of activity to solids is obviously lower than desirable. At a ratio of activity to total solids lower than one to ten, crystallization is virtually impossible.

Even though some noteworthy advances have been made in the art, present methods for obtaining an estrogenic crystallizate are still tedious, complicated, time-consuming, and grossly expensive. For example, the best method known to me for obtaining a satisfactory estrogenic crystallizate prior to the method of the present invention involves at least nine steps, numerous extractions, and the use of trimethylacetohydrazide ammonium chloride. It is obvious that a more technically and economically practicable method for increasing the ratio of estrogenically active material to total solids, which is utilizable for obtaining an estrogenic material which is crystallizable from organic solvents, as well as for obtaining the estrogenic crystallizate itself, would be highly desirable.

It is therefore an object of this invention to provide a simple and economical process for the purification of estrogenic material to increase the ratio of estrogenically active substances to total solids. Another object is to provide a process for the preparation of an estrogenic material which is convertible to an estrogenic crystallizate by direct crystallization from organic solvents. It is a further object of this invention to provide a method for accomplishing the above objects and for obtaining an estrogenic crystallizate directly from hydrolyzed urine without resorting to the use of ketonic derivatices, complexes, or other tedious and complicated procedures of the prior art. Other objects of this invention will become apparent hereinafter. Although the use of the present process in accomplishing the above objects is a very important application thereof, application of the steps of the process of the present invention to other phases of estrogen extraction, e. g., in the purification of estrogenic materials which are already somewhat purified, will be obvious to one skilled in the art.

The objects of the invention are accomplished using the following sequence of steps.

I. *Hydrolysis of urine according to conventional procedure*

While, for the purposes of the present invention, this step may be conducted in any conventional manner, as by acidifying to a pH of three and heating at a temperature of 90–100 degrees centigrade for two hours, to free the estrogenic materials from their conjugates, the use of hydrochloric acid has been found somewhat more desirable than the use of sulfuric acid, since the chlorides appear to be more soluble than sulfates and thus remain in the filtrate with reduction in bulk of the precipitate if a subsequent filtration step is to be employed. The urine may be concentrated if desired.

II. *Filtration, preferably using a filter aid*

(This step may be omitted if desired, but is definitely included for optimum purification and yields of crystallizate having highest percentage of activity.) The quantity of filter aid, for best results, appears to vary somewhat with the particular lot of urine, but is limited as to minimum amount only by satisfactory operativeness. This amount of filter aid may vary, for example, from 15 to 40 pounds per 750 gallons of starting urine. The filter aid, when employed, appears merely to act as such and not as an adsorbent of the estrogens. Any diatomaceous earth or other filter aid may be used in this step. Alternatively, concentration by evaporation may replace the filtration, although this is a less satisfactory procedure, since water-soluble impurities are thereby added.

III. *Treatment with organic solvent*

In case the filtration of Step II is omitted, Step III may also be omitted, or treatment with organic solvent may be carried out as a second step to extract the hydrolyzed urine, if desired (in which case the urine may be concentrated by evaporation), rather than to elute the filter cake from Step II. The organic solvent used for this step may be, for example, dibutyl ether, ethylene dichloride, butyl alcohol, or other organic ethers, alcohols, and chlorinated hydrocarbons, and where used to extract the hydrolyzed urine should be water-immiscible. If this step is included, either as a step to elute the filter cake or to extract the hydrolyzed urine, dibutyl ether is the solvent of choice for reasons which will be apparent from the following itemization of certain of its desirable properties, viz.:

(1) Low solubility in water and urine; (2) selective in extraction of estrogens leaving much undesired matter behind; (3) high boiling point so evaporation losses are negligible while vacuum distillation recovery is good; (4) estrogens are readily extracted from dibutyl ether with alkali-metal hydroxides, which is the step immediately following; (5) less tendency to form troublesome emulsions upon subsequent alkali-metal hydroxide extraction thereof.

After extraction or elution with solvent as above, the bulk of the solvent may be removed, as by distillation, usually to about 25 percent or less of the original volume. The solution may also be washed with an alkali-metal carbonate solution, e. g., sodium carbonate solution, to remove residual acidity at this point.

Steps I, II, and III provide a solvent solution of the crude estrogens contained in urine. However, other methods of obtaining this solution may be used. In certain embodiments of this invention the method by which this solution is obtained is not critical.

IV. *Obtaining an alkali-metal hydroxide solution of crude estrogenic tar*

This is a critical step in the process and is preferably accomplished by extracting the organic solvent obtained in Step III. The aqueous alkaline solution may also be obtained by the direct basification with an alkali-metal hydroxide solution of hydrolyzed urine (which may have been concentrated) or by the action of the alkali-metal hydroxide solution on solvent-free crude estrogenic tar. Sodium, potassium, lithium, or other alkali-metal hydroxides may be used with sodium hydroxide being preferred for reasons of commercial availability and economy. One normal sodium hydroxide solution is preferred, although any concentration of alkali that will dissolve the crude estrogenic tar is suitable. The pH of the alkali solution which will keep the estrogenic tar in solution is about 11.5, a pH more acidic than this tending to leave some of the material undissolved. For a quantitative recovery of the estrogenic material is undesirable. It is necessary therefore to have the aqueous alkali solution containing the tar at a pH of about 11.5 before further adjusting the pH as in Step V.

V. *Adjustment of pH of alkali-metal hydroxide solution to between about 8.5 and 11.5*

This step, like Step IV, is of the utmost criticality, and in every case follows Step IV. A pH of about 10.5 is considered optimum, and the adjustment may be made with any suitable agent having residual acidity such as sodium bicarbonate, hydrochloric acid, sodium hydrogen sulfate, and disodium hydrogen phosphate, which are representative of useful adjusting agents with many others being apparent.

VI. *Extraction of the pH adjusted alkali-metal hydroxide solution*

This step, in every case, follows Step V. The solution of adjusted pH is extracted with a suitable water-immiscible organic solvent such as an ether, a water-insoluble ketone, an aromatic hydrocarbon, a polychloroaliphatic hydrocarbon, and the like. Representative solvents are ethyl ether, ethylene dichloride, benzene, ethyl acetate, xylene, carbon tetrachloride, tetrachloroethylene, dibutyl ether, isopropyl ether, methyl chloroform, and methyl ethyl ketone. (See Example 4.) Ethylene dichloride is the preferred solvent in this step.

The hydrogen-ion concentration in this step is critical. If the solution is of a basic pH greater than about 11.5, a large portion of the estrogenic activity remains behind. If the solution is of an acidity greater than a pH of 8.5, the proportion of inactive solids extracted together with the active estrogenic material is increased to an undesirable extent, and usually to that point at which direct crystallization of the estrogenic substance after separation from the extracting solvent of this step becomes impossible.

The ratio of estrogenically active material to total solids recovered from the extraction Step IV in the pH range of 8.5 to 11.5 varies from 1:2 to 1:5. This material is suitable for direct crystallization from an organic solvent. When the pH of the solution extracted becomes more acid than 8.5, the estrogen to solids ratio is decreased to between 1:7 to 1:8. Such material contains an excessive amount of interfering impurities so that it is impossible to crystallize estrogenic material therefrom in any but minute quantities. For this reason the pH range of the solution extracted is highly critical, and the simple procedure of the present invention obviates completely the much less efficient and satisfactory prior art practice of employing a ketonic reagent such as trimethylaminoacetohydrazide hydrochloride to accomplish the same reduction in the ratio of total solids to estrogenically active material.

VII. *Recovery of purified estrogenic material*

The solvent is removed form the extract obtained from Step VI, e. g., by evaporation, whereupon a tarry mass of high estrogenic activity is obtained. This is usually of a non-crystalline nature, and has a ratio of estrogenically active material to total solids from 1:2 to 1:7, or even higher e. g., 1.5:1.

VIII. *Crystallization of the estrogenic material*

This may be conveniently accomplished according to conventional procedure, e. g., by dissolving the material from Step VII in a suitable organic solvent, e. g., methanol, ethyl acetate, benzene, chloroform, or the like, preferably while hot, and crystallizing the estrogenic crystallizate therefrom, as by cooling the solution. In this step, ethyl acetate is considered a somewhat more desirable solvent.

In its broader sense, the present invention contemplates the application of Steps IV, V, VI, VII, and, if desired, Step VIII, to any estrogenically active material to increase the ratio of estrogenically active material to total solids. While in the preferred manner of operation the process of the present invention is applied to hydrolyzed urine containing the estrogenic substances, e. g., a pregnancy urine, in which case it provides a simple and direct method of accomplishing the desired result, e. g., increase the activity to solids ratio, preparation of the crystallizable crude material, or preparation of the crystallizate itself, many other applications of the above steps to take the place of ketonic and other selective reagents will be immediately apparent to one skilled in the art.

Reference is made to the accompanying drawings which are diagrams illustrative of the flow of materials in the process, according to various embodiments of the present invention.

Figure 1 is a flow sheet depicting an embodiment of the process wherein the acid-hydrolyzed pregnant mare's urine is concentrated and the crude estrogenic substances therein directly dissolved by addition of alkali metal hydroxide until the urine solution is at a pH of at least 11.5, as indicated under Step IV above. After solution of the estrogenic material is attained, the pH of the urine solution is adjusted to between 8.5 and 11.5 by addition of a reagent having residual acidity, as indicated more fully under Step V above. The estrogens are then extracted from the solution within the critical pH limits with an organic solvent, and the alkaline urine solution discarded, as more fully discussed under Step VI above, and as illustrated by the following examples. Removal of the organic solvent and recovery of purified estrogenic material is then carried out according to the discussion under Step VII above, whereafter the estrogenic material, having a high activity to total solids ratio, may be directly crystallized from organic solvents according to conventional procedure for such crystallizations, as more fully disclosed under Step VIII above.

Figure 2 is a flow sheet of an embodiment of the invention which proceeds first through the step of extracting the urine solution with an organic solvent, which step is more fully disclosed under the above paragraph headed "Step III." After extraction of the urine solution with the organic solvent and discard of the aqueous urine solution, the organic extract is basified to a pH of at least 11.5 by addition of an alkali metal hydroxide solution, and the organic solvent discarded, as indicated more fully under Step IV above, and by the following examples. After this point, as will be noted from Figure 2, the procedure is substantially the same as that shown by Figure 1, proceeding in the same manner through Steps V, VI, VII, and VIII, as more fully disclosed above, and by the examples.

Figure 3 is a flow sheet of a preferred embodiment of the invention, which is preferably employed in lieu of the procedures depicted in Figures 1 and 2, and which is the process of Example 1. This procedure, as shown by Figure 3, and by Example 1, is substantially identical with the procedure of Figure 2, except for (a) filtration in the presence of a filter aid as a preferred manner of obtaining the organic solvent solution of crude estrogens, as disclosed under Step II above and (b) the optional step of washing the organic solvent extract of the filter cake with half-saturated sodium carbonate solution to remove residual acidity, prior to basification with alkali metal hydroxide solution to a pH of at least 11.5 to extract the estrogenic material from the solvent, as disclosed above under Step III. Figure 3 is also more complete in its depiction of the steps conventionally used in crystallization of estrogenic materials from a crystallization solvent, in accord with the procedure used in Example 1.

The following examples are illustrative of the present invention but are not to be construed as limiting.

EXAMPLE 1.—(*Composite of 12 runs*)

One hundred and thirty-five gallons of pregnant mare's urine, containing 24.4 grams of estrogenic material as shown by assay, was acidified to pH 3 with hydrochloric acid and then heated to 90–100 degrees centigrade for two hours. About four pounds of a diatomaceous earth filter aid (Hyflo Super-Cel, Celite) was added to the cooled, hydrolyzed urine with thorough stirring, and the suspension filtered. The filtrate, containing only about ten percent of the activity, was discarded. The filter cake contained 23.3 grams of estrogens.

The filter cake was eluted with about 18.0 gallons of dibutyl ether, and the dibutyl ether solution then washed with half-saturated sodium carbonate solution until the wash solution was alkaline to litmus. The washed dibutyl ether solution was concentrated to a volume of about one gallon and washed once with two gallons of half-saturated sodium carbonate solution, the wash solutions being discarded.

The dibutyl ether solution was then extracted several times with one-normal sodium hydroxide solution, a total of 1.4 gallons being used. To the sodium hydroxide solution was added sufficient solid sodium bicarbonate to convert the sodium hydroxide to sodium carbonate, about 1.0 pound being required, the pH of the resulting solution being about 10.5.

The buffered alkaline solution was extracted several times with ethylene dichloride, a total of two gallons being used. The ethylene dichloride was then removed from the combined extracts, leaving a residue of 61.4 grams of crude material which contained 19.5 grams of estrogenically active material as shown by the Kober color assay. The estrogen-to-solids ratio of this material was 1:3.1. The quantity of estrogenic material present in the tar represented 83 percent of that present in the diatomaceous earth filter cake.

The 61.4 grams of crude estrogenic material was dissolved in 20 milliliters of hot ethyl acetate, whereafter the solution was filtered and cooled. The precipitate was collected, again dissolved in hot ethyl acetate, treated with decolorizing charcoal, filtered and cooled. There was thus obtained 14.7 grams of solid, crystalline estrogenic material melting at 240–244 degrees centigrade $[\alpha]_D^{25} = +153.1$. The mother liquor contained an additional 4.8 grams of estrogenic material, the bulk of which was recovered by further treatment. Total recovery approached 80 percent.

Of the twelve runs, all but two produced recoveries in excess of 52 percent, with the highest recovery of crystalline estrogens being 80.5 percent.

Example 2

Two hundred and twenty-six gallons of pregnant mare's urine, containing about 4.7 grams of estrogens, was acidified with 18 degrees Be'. hydrochloric acid to a pH of 2–3 and heated to 95–100 degrees centigrade for two hours. After cooling to about 25 degrees centigrade, 12.5 pounds of a diatomaceous earth filter aid (Celite) was added, and the suspension pumped through a filter press which had been precoated with the filter aid. The filter cake, while still in the filter press, was washed with twelve three-gallon portions of ethylene dichloride. The combined ethylene dichloride washes (36 gallons) were washed once with 6.0 gallons of half-saturated sodium carbonate solution. The washed ethylene dichloride solution was distilled under reduced pressure. The residue was dissolved, with stirring, in 1.2 gallons of one-normal sodium hydroxide solution and decanted from any undissolved material. Three hundred eighty-two grams of sodium bicarbonate was then dissolved in the alkaline solution, the pH of the resulting solution being 10.5–11.0. The buffered solution was extracted five times with ethylene dichloride, a total of 2.0 gallons being used. The combined extracts were washed twice with water, the water washes extracted with fresh ethylene dichloride which was added to the main portion, and the ethylene dichloride removed to leave a residue weighing 15.90 grams. As shown by the Kober color assay, there were present 3.80 grams of estrogens, a ratio of solids to estrogens of 4.2:1. The solvent-free residue was crystallized from ethyl acetate as in Example 1, to give a highly-active crystalline product in excellent yield.

Example 3

Five hundred and thirty-eight gallons of urine, containing about 141 grams of estrogenic substances, was hydrolyzed and filtered as in Example 1. The filter cake was extracted twelve times with three-gallon portions of dibutyl ether. The dibutyl ether solution was washed, the solvent removed, and the residual crude material extracted with alkali-metal hydroxide solution, buffered to pH 10.5, extracted with ethylene dichloride, washed, and the solvent removed as in Example 1. There was thus obtained 398.0 grams of solids containing 113 grams of estrogenic material, a solids-to-estrogen ratio of 3.5:1. A crystalline product was obtained from this material without difficulty as in Example 1.

EXAMPLE 4.—*The effect of pH on the solids-to-activity ratio of an ethylene dichloride extract of pregnant mare's urine sodium hydroxide extract*

One hundred-milliliter aliquots of sodium hydroxide extract from the same lot were adjusted to the pH indicated in the table with sodium bicarbonate or hydrochloric acid and extracted with three 33-milliliter portions of ethylene dichloride and the total solids and Kober color assay run on this extract. The following table summarizes the results obtained:

| pH before extraction | | Color Assay (mg. estrone) | Solids (mg.) | Ratio of Solids to active Material |
|---|---|---|---|---|
| 11.5 | 1 N NaOH | 152 | 307 | 2.0–1 |
| 10.93 | 6.6 gm. NaHCO₃ | 280 | 1,444 | 5.2–1 |
| 10.48 | 7.5 gm. NaHCO₃ | 293 | 1,793 | 4.3–1 |
| 10.00 | 9.5 ml. HCl | 267 | 1,381 | 5.2–1 |
| 9.49 | 9.8 ml. HCl | 300 | 1,904 | 6.3–1 |
| 8.97 | 10.0 ml. HCl | 280 | 1,230 | 4.4–1 |
| 8.00 | 10.2 ml. HCl | 300 | 2,270 | 7.5–1 |
| 7.00 | 10.4 ml. HCl | 300 | 2,172 | 7.2–1 |
| 5.05 | 10.8 ml. HCl | 300 | 2,382 | 7.9–1 |
| 2.95 | 11.0 ml. HCl | 320 | 2,305 | 7.2–1 |

Work-up of the main lot from which the above material was taken yielded 329 milligrams estrone equivalent and 1417 milligrams total solids per 100 milliliters of original extract. This solids-to-activity ratio is 4.3 to 1.

EXAMPLE 5.—*Determination of solids and activity extracted by various solvents from a buffered sodium hydroxide extract of pregnant mare's urine*

A one-gallon aliquot of buffered sodium hydroxide extract was removed from the main lot which had been processed as in Example 1. One hundred-milliliter aliquots were extracted with three 33-milliliter portions of each of the solvents indicated. Activity was determined by Kober color assay and solids were run on the unwashed extracts.

The main lot from which the above aliquot was removed was worked up in the regular manner by extracting five times with a total volume of 80 gallons of ethylene dichloride and assayed 1183 grams estrone equivalent out of 5100 grams total solids. This calculates 329 milligrams estrone equivalent and 1417 milligrams total solids per 100 milliliters of the original sodium hydroxide extract. The solids to activity ratio is 4.3:1.

The following table summarizes the results obtained:

| Solvents used | pH before extraction | Color Assay (mg. estrone total) | Total Solids | Ratio of Solids to Active Material |
|---|---|---|---|---|
| Ethyl ether | 10.48 | 323 | 1,295 | 4.0–1 |
| Ethylene dichloride | 10.50 | 329 | 1,417 | 4.3–1 |
| Benzene | 10.49 | 225 | 577 | 2.6–1 |
| Ethyl acetate | 10.50 | 310 | 1,433 | 4.6–1 |
| Xylene | 10.39 | 85 | 316 | 3.7–1 |
| Carbon tetrachloride | 10.40 | 40 | 209 | 5.2–1 |
| Tetrachloroethylene | 10.53 | 63 | 250 | 4.0–1 |
| Dibutyl ether | 10.49 | 125 | 605 | 4.8–1 |
| Isopropyl ether | 10.50 | 220 | 699 | 3.2–1 |
| Methyl chloroform | 10.38 | 130 | 347 | 2.7–1 |
| Methyl ethyl ketone | 10.55 | 330 | 1,336 | 4.0–1 |

EXAMPLE 6.—*The solids-to-activity ratio obtained by extraction of the filter cake of pregnant mare's urine with various solvents*

Samples of hydrolyzed pregnant mare's urine were removed from a hydrolyzed lot immediately before turning off the steam. These were allowed to cool thoroughly and then slurried with five grams of Hyflo Super Cel and filtered through a Buechner funnel. The resulting cake was extracted in a centrifuge tube with one 200-milliliter and then four 100-milliliter portions of solvent. The extracts were assayed and total solids determined. The following table summarizes the results obtained:

| Solvent for extraction | Volume of urine extracted | Total Solids (grams) | Color Assay (mg. estrone equivalent) | Ratio of solids to Active material |
|---|---|---|---|---|
| | Ml. | | | |
| Dibutyl ether | 540 | 1.32 | 11.2 | 118–1 |
| Ethylene dichloride | 540 | 4.81 | 13.2 | 365–1 |
| n-Butyl alcohol | 550 | 2.20 | 12.5 | 176–1 |

In the above sample the ethylene dichloride was removed in vacuo, the residue taken up in one-normal NaOH, acidified, and extracted with ethyl ether. The ethyl ether extract assayed 13.2 milligrams estrone equivalent. Thus each solvent extracted the activity satisfactorily but the butyl ether extract contained considerably less solids.

Various modifications may be made in the present invention without departing from the spirit or scope thereof, and it is to be understood that I limit myself only as defined in the appended claims.

I claim:
1. A process for the production of an estrogenically active concentrate having a high ratio of estrogenically active substances to total solids directly from an acid-hydrolyzed estrogen-containing urine, which includes the following steps in the following order: (1) hydrolyzing urine with acid, (2) treating the acid-hydrolyzed urine with a diatomaceous earth filter aid and separating the filter aid embodying the estrogenically active substances and solids of the urine from the liquid, (3) extracting the estrogenically active substances from the filter aid with a solvent of the group consisting of dibutyl ether, n-butyl alcohol and ethylene dichloride, (4) extracting the resulting extract containing the estrogenically active substances with an aqueous alkaline solution having a pH of at least 11.5, (5) adjusting the pH of the resulting aqueous alkaline extract to approximately 10.5 by the addition thereto of a reagent having residual acidity, (6) extracting the said adjusted aqueous extract with a water-immiscible organic solvent for the estrogenic substances of the group consisting of ethylene dichloride, ethyl ether, ethyl acetate and methyl ethyl ketone, and (7) recovering the purified estrogenically active substances from the organic solvent extract.

2. A process for the production of an estrogenically active concentrate having a high ratio of estrogenically active substances to total solids directly from an acid-hydrolyzed estrogen-containing urine, which includes the following steps in the following order: (1) hydrolyzing urine with acid, (2) treating the acid-hydrolyzed urine with a diatomaceous earth filter aid and separating the filter aid embodying the estrogenically active substances and solids of the urine from the liquid, (3) extracting the estrogenically active substances from the filter aid with dibutyl ether, (4) extracting the estrogenically active substances from the said dibutyl ether extract with an aqueous alkaline solution having a pH of at least 11.5, (5) adjusting the pH of the resulting aqueous alkaline extract to approximately 10.5 by addition thereto of a reagent having residual acidity, (6) extracting the said adjusted aqueous extract with ethylene dichloride, and (7) recovering the purified estrogenically active substances from the ethylene dichloride extract by crystallization.

JOHN W. NELSON.

REFERENCES CITED

The following references are of record in the file of this patent:

UNITED STATES PATENTS

| Number | Name | Date |
|---|---|---|
| 1,967,350 | Doisy | July 24, 1934 |
| 2,196,295 | Eberlein | Apr. 9, 1940 |
| 2,215,628 | Weil | Sept. 24, 1940 |

FOREIGN PATENTS

| Number | Country | Date |
|---|---|---|
| 310,056 | Great Britain | July 17, 1930 |

OTHER REFERENCES

Veler in J. Biol. Chem., June 1930, pp. 357–374.